United States Patent Office 3,049,509

Patented Aug. 14, 1962

3,049,509

HETEROCYCLIC ULTRAVIOLET ABSORBERS

William B. Hardy, Bound Brook, Warren S. Forster, Basking Ridge, and John F. Hosler, Bound Brook, N.J., assignors to American Cyanamid Company, New York, N.Y., a corporation of Maine No Drawing. Filed Aug. 11, 1959, Ser. No. 832,906
6 Claims. (Cl. 260—45.8)

This invention relates to polymeric resinous compositions containing selective light arresters which exhibit high absorption capacities for incident ultraviolet radiation. This invention further relates to ultraviolet light filters, especially membranous plastic types, adapted for wrapping or shielding a variety of consumer commodities and thus protecting said commodities from the deleterious effects of ultraviolet radiation. More particularly, this present invention concerns transparent, substantially colorless light screens which are substantially opaque to incident solar ultraviolet radiation within the range of from about 310 to 380 mμ wave length, comprising a thin, self-sustaining thermoplastic film containing as a selective ultraviolet absorber an aryleneazole substituted in the 2 position by an aromatic radical having a hydroxy substituent in the aromatic radical ortho to the point of attachment and including various benzoxazoles, benzimidazoles and benzothiazoles.

The comparatively recent years have witnessed considerable investigative activity directed to the problem of coping with chemical changes effected by actinic radiation, or more specifically, that actinic radiation associated with solar energy not substantially attenuated by the earth's ionosphere or atmosphere. It is known that this type of spectral radiation, namely, of from about 300 to 390 mμ is the primary cause of the photochemical phenomenon. This phenomenon may be beneficially utilized in some instances such as in acquiring a fashionable "suntan" or in deriving certain therapeutic values therefrom. However, by and large actinic radiation exposure induces deleterious results in inanimate objects. Thus, all of known synthetic plastic compositions are without exception adversely affected by prolonged exposure to ultraviolet light. The deleterious results experienced may be in the form of objectionable yellowing of the plastic and/or the physical properties thereof such as the mechanical strength properties may be degraded. Similarly, food stuffs, particularly those containing oleaginous materials, such as for example, potato chips and bakery goods are particularly prone toward rancidity development induced by ultraviolet radiation. It is known that the physical properties of naturally occurring polymeric products such as rubber are adversely affected by said radiation. Additionally, it is known that actinic radiation largely accounts for the bleaching of dyes and pigments which is popularly attributable to visible radiation. It will become apparent hereinafter how our invention may be employed to combat the above described among other degenerative processes induced by actinic radiation exposure.

The solar spectrum represents the primary source of near ultraviolet radiation occasioning photochemical effects. About 5% of the total energy of solar radiation reaching the earth proper resides in this troublesome area, namely, from about 300 mμ to about 400 mμ.

Analogous somewhat to the property of certain materials, such as for example pigments or dyes, to absorb energy within the visible spectrum and selectively reflect a given band or color, there are chemical compounds which are capable of substantially and preferentially absorbing near ultraviolet radiation. The quest and evaluation of these chemical compounds has been actively undertaken within recent years for it has been found that minute amounts of these absorbers may be incorporated into plastics and thereby ultraviolet light stabilization of the plastic carrier can be efficiently effected in this manner. In those instances where the absorber cannot be added to the material such as comestibles, of which more or less temporary protection is desired, the material is enclosed with a transparent plastic wrapping containing the absorber which serves as a filter for the harmful rays. Our invention has particular utility in the latter application as will be seen hereinbelow.

The ultraviolet light absorbing compounds referred to are commonly called U.V. absorbers and are characterized by having a peak absorption in the range of from about 320 to 370 mμ. A further required quality of these materials is that their absorption drops off sufficiently in the region approaching the visible range so that the absorbing compound imparts little or no visible color to any carrier in which it may be employed.

The above are perhaps the fundamental requisites of a suitable chemical U.V. absorber. However, in addition to these qualities, effective ultraviolet light absorbers must possess other properties. One of such collateral properties is that they must have a sufficient capacity to absorb the comparatively abundant quantity of U.V. radiation that may be present in sunlight. Absorption capacity is referred to in terms of the compounds absorptivity index. Reference has been made previously to the peak absorption characteristic of the ultraviolet absorber. This infers that the absorbing compounds in general do not possess the same capacity to absorb throughout all the wave length region represented by the near ultraviolet range. Generally these compounds will exhibit variable absorption capacities within this range. Accordingly, the measure of the degree of absorption at the wave length where the compound absorbs most strongly is taken as indicative of the overall absorbing capacities of the compound throughout the entire range. In other words, the nature of the absorption characteristics of these chemical absorbers is such that if the compound exhibits peak absorption of a required degree within about the middle portion of the ultraviolet range, i.e., 320 to 370 mμ, it may be expected that the compound will be an effective absorber over the entire range, namely, from 300 to 390 mμ. The wave length where the strongest absorption takes place is λ max. The maximum capacity of the absorber to absorb at the applicable wave length (λ max.) is indicated in terms of a constant expressed as $a$ max. The constant of absorptivity coefficient represents the greatest strength of absorption in the near ultraviolet region that a unit concentration of an absorber in a unit thickness of solution will display. The unit concentration and thickness are usually 1 gram per liter and 1 centimeter, respectively. The absorptivity or absorbance of any other concentration or thickness is represented by the product of the absorptivity coefficient ($a$ max.), the concentration ($c$), and the thickness ($l$). The absorbance is simply the negative logarithm of the fraction of light transmitted at that wave length ($-\log T$) and holds significance for those skilled in the art as an index of absorption. The value of the absorptivity coefficient at the wave length maximum can be used to judge the probable effectiveness of compounds in dissipating ultraviolet energy. For compounds that absorb broadly in the near ultraviolet region, a value of $a$ max. greater than 20 usually indicates that the compound will absorb efficiently throughout the region at reasonably low concentrations.

By comparison, the better known commercial absorbers such as certain of the substituted benzophenones exhibit values ranging from 30 to about 55. This constant is ordinarily determined using a solution of the absorber in an organic solvent such as aromatic hydrocarbon, e.g., toluene, or a polar solvent such as an alcohol ethyl or butyl acetate, since these solvents represent a reasonable prototype of the polymeric materials in which these light absorbers are commonly employed.

In addition to the above-stated absorptivity requirement, the absorbing compound must exhibit a degree of stability toward the actinic radiation which it absorbs. It is known generally that these absorbing compounds alter the nature of the absorbed energy and for the most part reradiate this energy in the form of harmless energy such as heat. The mechanism whereby this change is accomplished by the compound is not precisely known, nevertheless, as might be readily expected this mechanism takes a toll on the compound itself. Where compounds can undergo this process for extended periods of ultraviolet light exposure they are spoken of as being stable. Of course ultimately all of the stabilizers are degraded by this absorption mechanism.

The present invention is based on the discovery that certain aryleneazoles are effective U.V. light absorbers. These compounds represented by the following formula:

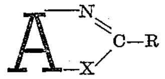

where A is a 6 membered aromatic carbocyclic ring, X is NH, S or O and R is either a monocyclic or bicyclic aromatic group containing a hydroxyl substituent in the position ortho to the point of attachment of the said aromatic group.

The absorbing compounds of this invention possess unusually high absorptivity indices, or more specifically, exhibit very high *a* max. values. These values range from about 50 to as high as 110. All of the absorbing compounds embraced by the formula given hereinabove exhibit peak absorption characteristics in the range from about 320 mμ to about 360 mμ. Thus, from what has been said they can be considered as effective absorbers throughout the near ultraviolet range. Since the absorbers of this invention have unusual high absorbing capacities in the ultraviolet range they are advantageously adapted for use in thin film carriers which may be employed as filters or protectors for other commodities, for which protection from the harmful ultraviolet rays is desired. In this respect the compounds of this invention are significantly superior to the substituted benzophenone commercial absorbers. However, the aryleneazoles of this invention do not possess the degree of stability or permanence usually associated with the benzophenone absorber. Accordingly, the aryleneazoles of our invention have particular utility in the preparation of light filters designed for temporary use. Specific examples of uses of this nature will be adequately outlined hereinbelow. The aryleneazole absorbers of this invention are relatively inexpensive to prepare which feature also makes them particularly suitable for the preparation of temporary light filters or wrapping tissues.

A class of aryleneazoles has been proposed heretofore in the prior art as U.V. light absorbers. However, the compounds of the prior art exhibit peak or maximum absorptivity characteristics at wave lengths less than about 300 mμ. They have been proposed as additives to suntan lotions where they effectively absorb the extremely minor portion of the solar energy below about 300 mμ which causes harmful skin burns and yet they permit the penetration of the tanning portion of the ultraviolet spectra, namely, from about 320 mμ and upwards. The compounds of the instant invention differ from those disclosed in the prior art in that they carry an ortho hydroxy substituent in the aromatic radical attached to the 2 position of the aryleneazole. This hydroxy substituent effected a change in the absorption characteristics of the azole which was totally unexpected. In general the hydroxy substituent shifts the wave length of peak absorption at least about 20 mμ above that shown by comparable aryleneazoles lacking the ortho hydroxy substituent. Accordingly, this finding renders a particular class of aryleneazole derivatives suitable for use in preparing light filters used to protect objects from the deleterious effects from the ultraviolet radiation.

The reactions employed for the preparation of the ultraviolet light absorbing aryleneazoles of this invention involve treatment of an aldehyde or an acid, including functional derivatives of the latter such as an ester, amide or a nitrile, with a o-phenylene diamine to form a benzimidazole; or with an o-aminophenol to form the benzoxazole; or with an o-aminothiophenol to form a benzothiazole. Examples of these reactions may be represented by the following equation:

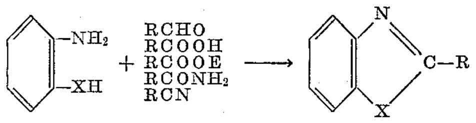

where X is NH, S or O; and R is a mono or bicyclic aromatic radical containing a hydroxy group ortho to the functional aldehyde or carboxylic (or functional derivative) group substituent.

Various o-phenylene diamines, o-aminophenols and o-aminothiophenols may be used in the preparation of the benzimidazoles, benzoxazoles and benzothiazoles, respectively. Representative among the applicable compounds of this type are such as salicyclic acid, resorcyclic acid, 2-hydroxy-3-methoxybenzaldehyde, 2 - hydroxy-4-methoxybenzaldehyde, 2 - hydroxy-4-chlorobenzaldehyde, salicyl aldehyde, 2-napthol-3-carboxylic acid, phenyl 1-hydroxynaphthalene -2-carboxylate, and the like. Each of these compounds may be reacted with any one of the aromatic amine derivatives mentioned in order to secure the particular aryleneazole desired.

The cyclization reaction which yields the aryleneazole in accordance with the above equation is customarily conducted in a reaction medium consisting of an acid. Suitable acidic media include such as sulfuric acid, hydrochloric acid, acetic acid, phosphoric acid, polyphosphoric acid, etc. Polyphosphoric acid represents the preferred acidic medium for carrying out the cyclization reaction mainly because the use of acid results in an excellent yield of the reaction product. The polyphosphoric acid referred to is an article of commerce and obtainable with various concentrations of $P_2O_5$. The polyphosphoric acids which are particularly useful in the process of preparing the instant aryleneazoles may have a $P_2O_5$ content from about 89%. The cyclization reaction may be conducted over a wide range of temperatures from about 100° C. to about 350° C. The lower limit of temperature is governed by the physical properties of the polyphosphoric acid, in that below 100° C. it becomes very viscous and stirring difficulties are encountered. The actual temperature for a particular reaction involving particular reactants is one chosen that will result in the reaction going to completion within a reasonable time. The temperature used generally falls within the range of about 125° C. to 250° C. However, as indicated temperatures as high as 350° C. may be used.

Usually the minimum amount of polyphosphoric acid is used which permits efficient stirring of the reaction mixture. Larger amounts may be used, and the upper limit is governed only by economic considerations. From about 5 parts to 40 parts polyphosphoric acid per part of the carboxylic acid or its functional derivative is an effective range, considering economy and stirrability. About 15 to 20 parts on the same basis is frequently preferred.

The ratio of reactants is such that a stoichiometric relationship exists between the amino component and the carboxylic acid or its functional derivative. If dibasic carboxylic acids are employed it is necessary to adjust the amount of amino compound employed so that one equivalent of the latter exists for one carboxylic acid group contained by the dibasic component, otherwise if a stoichiometric amount of amino compound is employed, both the carboxylic groups react and a bis azole compound will be formed.

In the specific embodiments given hereinbelow details as to the preparation of the various aryleneazoles will be given which will be representative and exemplary of the more efficient processes for deriving these compounds.

Numerous types of plastic materials may be used as carriers for the aryleneazoles contemplated herein in the preparation of ultraviolet light filters. Suitable among these plastic carriers are such as: thermoplastic polymer substance derived by the addition polymerization of a vinyl monomeric compound, e.g., styrene, vinylidene chloride, vinyl chloride or copolymers of these chlorine containing vinyl monomeric materials; polyester materials such as the high molecular weight esterification products of a glycol with terephthalic acid, condensation products derived by auto-condensing an alkylene oxide such as ethylene oxide and propylene oxide, and the nylon type polymers derived by condensing an aliphatic polymethylene diamine with an aliphatic dicarboxylic acid. Additionally one may employ as a suitable carrier, plastics derived from the thermoplastic lacquer types such as for example, nitrocellulose, cellulose acetate, benzyl cellulose and the like. The thermoplastic lacquer types are seldom used as such for the preparation of self-sustaining films. However, they are conventionally employed to moisture proof hydrophilic materials like regenerated cellulose (cellophane).

Accordingly, when it is desired to prepare a filter from a regenerated cellulose film we prefer to incorporate the aryleneazole absorbed in the moisture proofing coating associated with the cellulosic substrate rather than add the absorber to the cellulose dope which is alkaline in nature and may detrimentally affect the absorber.

The thickness contemplated for self-sustaining films that may be used in the practice of this invention range from about 1 to 50 mils. Ordinarily, a thickness in the range of from about 1 to 5 mils is customarily employed to prepare wrapping tissues. Nevertheless, temporary screenings may be prepared within the spirit of this invention having a thickness of 50 mils or even greater. The plastic materials enumerated herein above for the preparation of self-sustaining films are commercially available materials. However, details as to the preparation of representative of these plastic materials will be given in the examples presented hereinbelow.

From what has been said hereinabove, the primary objective of this invention is to prepare self-sustaining film light filters which may be used for more or less temporary protection of various commodities subject to the deleterious effects of actinic radiation. With this object in mind, it is accordingly not necessary that the light absorber impart significant protection to the plastic itself. However, certain of the aryleneazoles are uniquely adapted to impart U.V. stability towards degradation to the plastic itself.

Notable among the plastic materials wherein this type of protection is afforded is represented by a resinous composition comprising a heat-stabilized polyvinyl chloride.

The aryleneazole light absorbers of this invention are conveniently incorporated into the thermoplastic materials contemplated in most instances by merely milling the absorber with the plastic.

In applicable situations they may be added to dopes or solutions of the plastic prior to the casting or extrusion of a film therefrom. The amount of absorber which will effect substantially complete ultraviolet light opaqueness in a plastic film even in the lower range of thickness of specified ranges from about 2% to about 10%. The term substantially complete absorption or opaqueness as employed herein refers to the ability of the plastic screen to filter out or arrest about 95% or more of incident near U.V. radiation.

In the preparation of temporary light filters it is obviously desirable to employ the least amount of the absorber which will effect the desired degree of U.V. opaqueness. This amount when based on weight of the carrier is variable and accordingly depends or varys inversely with the thickness of the plastic film. For example, if a certain percent of the absorber renders a given thickness of film substantially opaque, then this amount is to be doubled if said given thickness is halved. Conversely, if said given thickness is doubled then the amount of absorber found effective for said given thickness may be reduced by 50%.

A simpler way of designating the amount of light absorber required to render the film substantially opaque to ultraviolet radiation is to express this amount in weight per square unit of surface presented by the plastic carrier. This figure is independent of the particular thickness of the film carrier employed. The amount of aryleneazoles of this invention will, on the basis, range from about 1.0 to 2.0 g. per square yard of the film.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

EXAMPLE I 2-(2-hydroxyphenyl)benzothiazole was prepared in the following manner. A mixture of 25 parts of 2-aminothiophenol, 27.6 parts of salicyclic acid, and 400 parts of polyphosphoric acid is heated to 200° C. until the reaction is complete. The solution is then drowned in 300 parts of water and the gray precipitate that forms is removed by filtration. The solid is washed free of acid with water and then slurried in dilute sodium bicarbonate solution and removed by filtration. The crude product is further purified by treatment with activated charcoal and is then extracted with hot methanol. The melting point of the cyclization product corresponding to 2-(2-hydroxyphenyl)benzothiazole was 131.0° C.

A copolymer of 75 parts vinylidene chloride and 25 parts vinyl chloride was fed into a heated compounding extruder along with the above aryleneazole compound in the weight ratio of 100:5, respectively, to produce a thin transparent sheet. The thickness of the film product was in the order of 4 mils. A control sheet was prepared by simply shutting off of the supply of aryleneazole compound.

Swatches of alpha cellulose dyed with a fugitive dye were covered with the film containing light absorber and the control sheet. The test samples were subjected to exposure by a General Electric S1 sun lamp for a period of 50 hours. Following this period of exposure, the swatch under the ultraviolet light filter of this example evidenced no perceptible change in color. The swatch shielded by film containing no absorber, on the other hand, had substantially completely bleached.

EXAMPLE II 2-(-hydroxyphenyl)benzimidazole was prepared in the following manner. A mixture of 27.5 parts of salicyclic acid, 23 parts of o-phenylene diamine 400 parts of polyphosphoric acid is heated to about 250° C. with stirring until the reaction is complete (4½ hours). The mixture is then cooled and poured into 2000 parts of water causing the formation of a redish tan solid precipitate. The solid is collected by filtration, reslurried with 200 parts of 10% sodium carbonate solution, and the residue is again removed by filtration and washed with water. Recrystallization from aqueous alcohol resulted in very fine, light tan crystals having a melting point of 241.6–242.2 (corr.). 81% recovery was experienced in this reaction process.

A solution is formed of 4 parts by weight of the above aryleneazole compound in a mixture of 100 parts of ring-substituted styrenes, consisting of 65% p-methylstyrene, 33% o-methylstyrene, and 2% n-methylstyrene. The mixture is polymerized in bulk first by heat for 3 days at 100° C., then the temperature is increased 130° and the polymerizing mixture held at said temperature for 4 days. The resulting polymer is milled on heated rolls at 165° C. so as to remove any unreacted monomer. Sheets are then formed having a thickness of 5 mils. The light screening efficiency of this film was tested in an identical manner as employed in Example I, and found to be an effective U.V. light screen.

EXAMPLE III

A relational comparison of representative aryleneazole light absorbers of this invention with prior art aryleneazole compounds and certain commercial benzophenones is given in the following table. The wave length at peak absorption (λ max.) and the absorptivity constant at maximum or peak absorption (*a* max.) are given for each of the respective compounds. These constants were determined for ethyl alcohol solutions of the absorber.

*Table I*

| U.V. Absorber | λ max. | *a* max. |
|---|---|---|
| 2-(2-hydroxyphenyl)-benzothiazole | 333 | 73.3 |
| 2-(2-hydroxyphenyl)-benzoxazole | 329 | 91.4 |
| 2-(2,4-dihydroxyphenyl)-benzothiazole | 337 | 111.4 |
| 2-(2-hydroxyphenyl)-6-ethoxy-benzothiazole | 338 | 89.6 |
| 2-(2-hydroxy-4-methoxy-phenyl)benzothiazole | 337 | 106.6 |
| 2-(2-hydroxy-5-chlorphenyl)benzothiaxole | 338 | 52.3 |
| 2-(3-methoxy-4-hydroxy phenyl)benzimidazole | 312 | 117.4 |
| 2-(1-hydroxy-2-naphthyl)benzoxazole | 366 | 67.2 |
| 2-(1-hydroxy-2-naphthyl)benzimidazole | 359 | 79.1 |
| 2-(2-hydroxyphenyl)-benzimidazole | 319 | 82.4 |
| 2-hydroxy-4-methoxy-benzophenone | 328 | 41.7 |
| 2,2'-dihydroxy-4,4'-dimethoxybenzophenone | 357 | 72.0 |

A master batch of plasticized polyvinyl chloride is made by mixing 100 parts of a commercial polyvinyl chloride with 2 parts of a barium-cadmium laurate for 2 hours. Then a solution consisting of 1 part of an aryl phosphite in 50 parts of di-2-ethylhexyl phthalate is slowly added to the above dry resinous admixture while mixing. The mixer is stopped and some mixing is done by a hand paddle and then the mixer is run for about 16 hours.

One hundred gram portions of the above are fluxed on a hot 8" roller mill (front roll about 300° F., rear roll about 325° F.). The polyvinyl chloride is banded on the front roll and then sheeted off. A measured quantity of 2-(1-hydroxy-2-naphthyl)benzimidazole (Table I) in the amount of 0.1 gram is sprinkled on the sheet and the sheet is further rolled for 40 passes (about 5 minutes). A sample sheet is similarly prepared from a portion of plasticized polyvinylchloride containing no light stabilizer.

The compounded, rolled polyvinyl chloride samples are placed in double cavity mold, each cavity 2" x 5" x .05" and hot pressed 4½ minutes at about 280 to 325° F. and at a total pressure of about 10,000 pounds and then cooled.

Duplicate samples of the plastic containing the absorber are compared with duplicate samples of the same plastic containing no absorber (control), by exposure in a Fadeometer until all samples show at least one spot. The times for this spot to occur in each of the respective sets of samples were averaged to give the value set forth in the table below. The specimens were then re-exposed and the time for the control to obtain an appearance representing substantially complete degradation was noted. The stabilized plastic specimens were retained in the testing unit until their appearance is approximately similar to the appearance of the control at its off-test time. These results are set forth in the following Table II.

*Table II*

| Specimen | First Spot, hours | Off-Test, hours |
|---|---|---|
| Light Stabilized PVC | 264 | 814 |
| Control | 110 | 440 |

EXAMPLE IV

A viscose dope is prepared using 270 parts by weight of alkali cellulose prepared in the customary way and containing 77 parts of cellulose, 24.3 parts of carbon disulfide and 17.5 parts of sodium hydroxide. The carbon disulfide is added in one portion and the mixture is agitated in a suitable dough mixer at about 20° C. for 22 hours. After xanthation is complete, the resulting mixture is diluted with 595 parts of water. This solution is then aged at about 5° C. Next a vacuum is applied to remove air bubbles from the solution and the material is regenerated in film form in the usual manner by extrusion through a slit into an aqueous bath containing 10% sulfuric acid, 1% zinc sulfate, 14% sodium sulfate, 10% glucose and the balance water. The above description shows the preparation of film material derived from regenerated cellulose. It is the purpose of this example to show that hydrophilic materials of this type can be beneficially employed in the process of our invention. It is possible to add any of the aryleneazole absorbers of this invention directly to the dope used to prepare the film material. However, since our absorbers possess unusually high absorptivity characteristics, they may be incorporated effectively for the purposes herein in a nitrocellulose or equivalent material which is invariably used to coat regenerated cellulose films in order to render same moisture proof. The alkaline nature of regenerated cellulose dope prompts this preference. Accordingly, this example illustrates this preferred mode for preparing light filters from regenerated cellulose.

To a commercial grade of lacquer solution (IPA–EAX 24960) is added the absorber 2-(1-hydroxy-2-naphthyl)-benzoxazole, in the amount of 10% of the absorber based on the lacquer solids. This was accomplished by thinning the lacquer solution in the amount of 100 parts with 30 parts of an ethyl alcohol solution containing 20 parts of the absorber per 100 parts of the alchol. The lacquer solution containing the U.V. absorber was then applied by means of an equalizer rod to the regenerated cellulose film described above having a thickness of .002". The coated film was then subjected to a moderate elevated temperature whereby the solvent component of the nitrocellulose solution was evaporated off. The lacquer coating was approximately 0.5 mil thick.

The coated film prepared in the manner described was found to substantially preclude the transmission of ultraviolet light within the range of 300 to 390 mμ. The film was crystal clear and suitable for wrapping colored textile materials or similar commodities that might show evidence of nonuniform fading upon extended exposure to light.

We claim:

1. A film essentially comprising a polymeric material selected from the group consisting of (*a*) polystyrenes, (*b*) polyvinylidene chlorides, (*c*) copolymers of (*b*), (*d*) polyvinyl chlorides, (*e*) copolymers of (*d*), (*f*) polyesters, (*g*) polyalkylene oxides, (*h*) superpolyamides, (*i*) nitrocellulose, (*j*) cellulose esters, and (*k*) cellulose ethers and having from .1% to 5.0% by weight of an ultraviolet absorbing compound selected from the group consisting of 2-R-benzoxazole, 2-R- benzimidazole and 2-R-benzothiazole wherein R is a member selected from the group consisting of o-hydroxyphenyl and o-hydroxynaphthyl, said compound bearing from 0 to 1 substituent selected from the group consisting of chloro, hydroxy and alkoxy.

2. A film according to claim 1 wherein the ultraviolet absorbing compound is 2-(2-hydroxyphenyl)-benzothiazole.

3. A film according to claim 1 wherein the ultraviolet absorbing compound is 2-(1-hydroxy-2-naphthyl)-benzimidazole.

4. A film according to claim 1 wherein the ultraviolet absorbing compound is 2-(2-hydroxyphenyl)-benzoxazole.

5. A light-stabilized resinous composition of matter comprising a heat-stabilized polyvinyl chloride containing from about .1% to 5.0% of 2-(2-hydroxyphenyl)benzothiazole.

6. A light-stabilized resinous composition of matter comprising a heat-stabilized polyvinyl chloride containing from about .1% to 5.0% of 2-(2-hydroxy phenyl)-benzimidazole.

References Cited in the file of this patent

UNITED STATES PATENTS

| | | |
|---|---|---|
| 2,476,832 | Donia | July 19, 1949 |
| 2,727,879 | Vincent | Dec. 20, 1955 |
| 2,917,402 | Sapper | Dec. 15, 1959 |

FOREIGN PATENTS

| | | |
|---|---|---|
| 513,267 | Canada | May 31, 1955 |